Nov. 14, 1961 A. L. McCOY 3,008,456
MASTER CONTROL VALVE FOR MULTIPLE HYDRAULIC CIRCUITS
Filed May 13, 1957 3 Sheets-Sheet 1

ALVA L. McCOY
INVENTOR.

BY
ATTORNEY

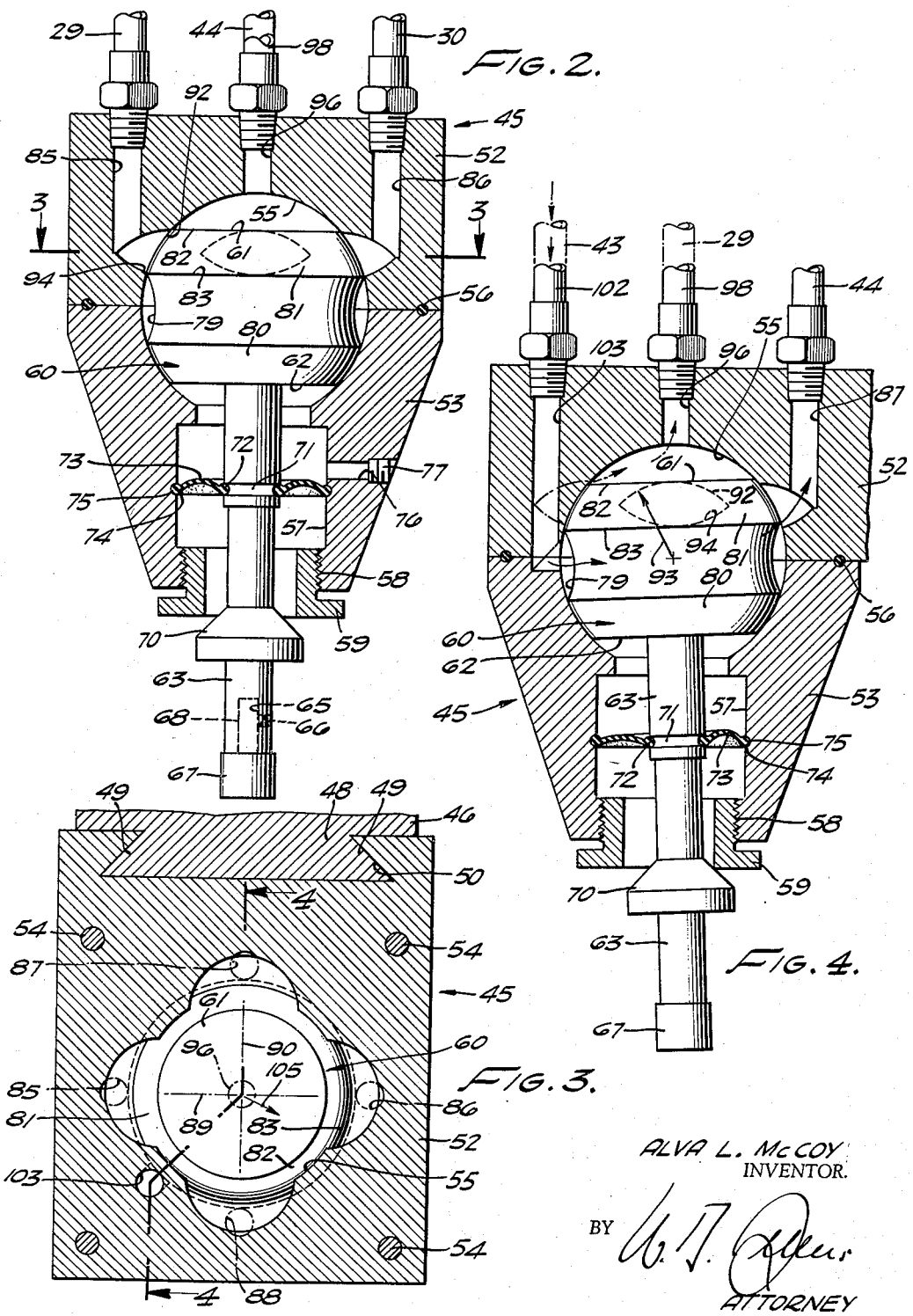

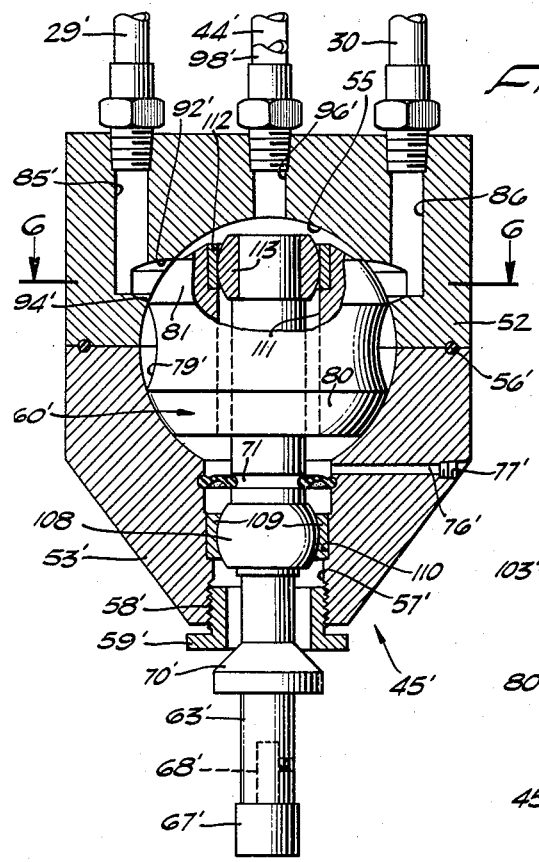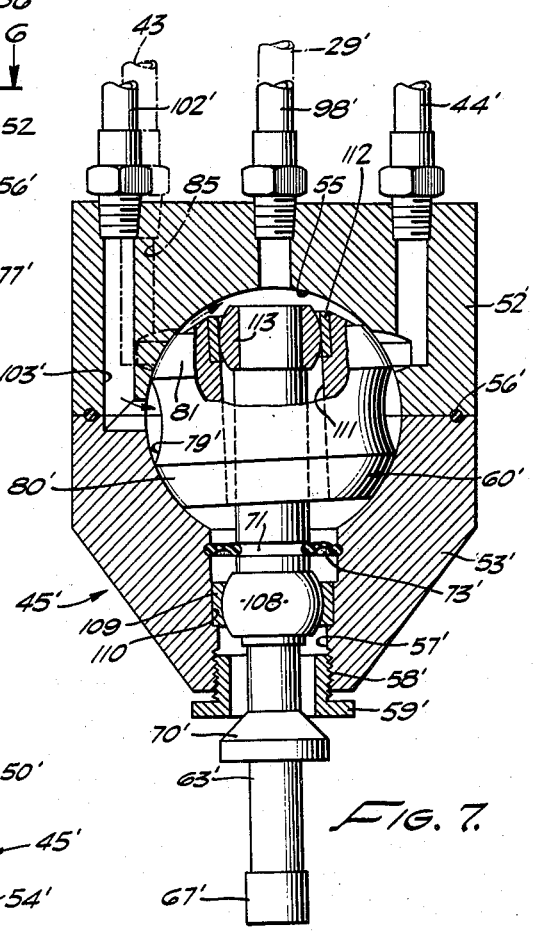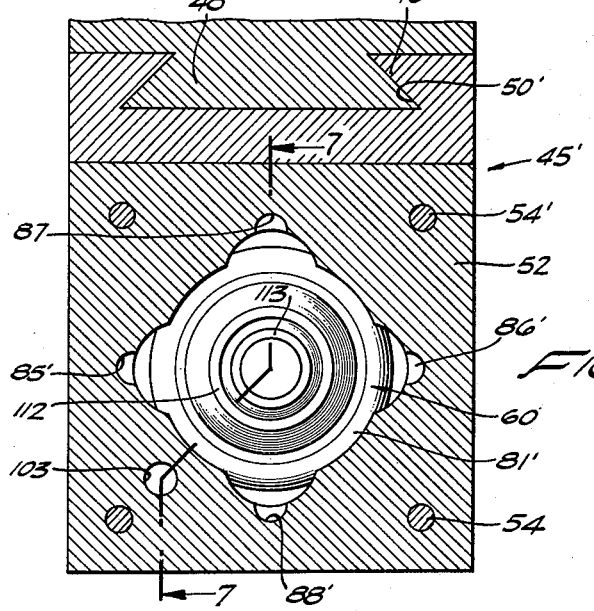

United States Patent Office 3,008,456
Patented Nov. 14, 1961

3,008,456
MASTER CONTROL VALVE FOR MULTIPLE
HYDRAULIC CIRCUITS
Alva L. McCoy, Alhambra, Calif., assignor, by mesne assignments, to Young Spring & Wire Corporation, Detroit, Mich., a corporation of Michigan
Filed May 13, 1957, Ser. No. 658,720
17 Claims. (Cl. 121—46.5)

This invention relates to hydraulic control circuits and more particularly to an improved master control valve for controlling a plurality of such circuits simultaneously with preciseness, smoothness, and at high speed without hydraulic hammer or over-run.

The fluid control problems to which the invention is applicable are manyfold and are multiplying daily with the increasing number of tasks being found for fluid power. Reference is had, for example, to machine tools of many kinds, to tracer and profiling mechanisms, fire control systems, guided missile controls, servo mechanisms, aircraft controls, instrumentation drives and linkages, and many others. Various control devices have been proposed heretofore in an attempt to meet the exacting requirements presented by these applications and certain of these are in use. However, all such devices, so far as known, are subject to serious shortcomings and disadvantages sought to be obviated by the present invention. Certain more serious objections to prior designs include the lack of preciseness and the inability to provide duplicate results in response to duplicate input conditions. Response is also too sluggish for many operating requirements. Speed in carrying out the required control mission is lacking or obtainable only by sacrificing accuracy and tolerating over-run and hydraulic shock. In many instances sluggishness, inaccuracy and unreliability are attributable to the complexity of the mechanism and the inability to meet the large number of manufacturing tolerances specified for the components.

The present invention seeks to obviate in their entirety the foregoing and other shortcomings of prior hydraulic controls. In brief, this is accomplished by a greatly simplified master control valve having a single moving part directly actuated by a stylus or other feeler input element for initiating a change in the hydraulic circuits. This single moving part is universally supported in a fluid-tight manner within an enclosing housing. Opposed spherical surfaces of the moving valve part and of the housing are preferably located laterally of and closely adjacent a plane through the pivot axis of the part, this disposition being important in achieving full pressure balancing, quick response coupled with smoothness of operation, and substantially effortless actuation despite its use to control high fluid pressures. It is found that the absence of over-run, another highly important characteristic, is directly traceable to the controlled acceleration and deceleration of the present valve design by which the valve anticipates approach to its neutral position and automatically feathers the fluid flow appropriately.

Another important feature is the provision made for the wide range control of fluid flow in one circuit without changing the relative rates of fluid flow in another circuit. Stated differently, a change in the rate of flow in one circuit remains strictly proportional to the rate of change in another circuit throughout a wide range of flow rates with the result that high speed control is provided without sacrificing accuracy or, in fact, any other characteristic of the control.

Unlike certain prior valve designs the present valve is equally and fully responsive to movement away from the neutral position in all directions, whereas prior valves are inherently non-responsive to direction changes occurring in some planes such as those mid-way between pairs of the port axes, as well as responsive in varying degrees in positions to either side of these so-called dead spot positions.

The valve of this invention is characterized by a moving part so arranged relatively to both the high and low pressure sides of the hydraulic circuit as to be substantially completely self-balanced under all operating conditions with the single moving part floating on a fluid film and instantly responsive to the slightest pressure. For this reason, the valve automatically returns to a neutral position by the weight of the stylus when the latter is supported vertically below the valve casing as it is in a preferred arrangement.

Accordingly, it is the primary object of the invention to provide an improved and greatly simplified master control valve for a plurality of circuits.

Another object of the invention is the provision of a control valve having a minimum of relatively moving parts actuated from a single control element and wherein the movable valve element floats in fluid substantially free of unbalanced pressure differentials.

Another object is the provision of a ball valve controlling a plurality of pairs of fluid ports having axes arranged at right angles to one another with fluid flow blocked in a single neutral position of the valve and free to flow between said pairs of ports when moved in any direction from said neutral position, the direction of fluid flow being determined by the direction of valve movement and the rate of flow between pairs of ports being dependent on the direction and magnitude of movement from neutral.

Another object of the invention is the provision of a master control valve for multiple hydraulic circuits which is responsive to the slightest pressure in any planar direction to initiate or cut off fluid flow free from hydraulic shock or over-run.

Another object is the provision of a master control valve having a single neutral position wherein fluid flow is blocked and an infinite number of positions on all sides thereof wherein fluid flow occurs in directions and quantities depending upon the position of the valve relative to its neutral position.

Another object of the invention is the provision of a master control valve for multiple fluid circuits so arranged that the volume and direction of flow therein precisely reflects the direction and magnitude of departure from neutral of a control element for the valve.

A further and important object is the provision of a multiple circuit control valve having a universal valving element controlling flow passages arranged at right angles and selectively operable to control flow at widely differing rates through either passage without permitting any flow through the other passage.

These and other more specific objects will appear upon reading the following specification and claims and upon considering in connection therewith the attached drawings to which they relate.

Referring to the drawings in which preferred embodiments of the invention are illustrated:

FIGURE 2 is a sectional view taken along line 2—2 of FIGURE 1 through the master control valve;

FIGURE 3 is a transverse sectional view along broken line 3—3 of FIGURE 2;

FIGURE 4 is a longitudinal sectional view along broken line 4—4 of FIGURE 3 showing the valve element tilted slightly to the right from its neutral position;

FIGURE 5 is a longitudinal sectional view similar to FIGURE 2 through a modified embodiment of the valve;

FIGURE 6 is a transverse sectional view taken on line 6—6 of FIGURE 5;

FIGURE 7 is a longitudinal sectional view taken along broken line 7—7 on FIGURE 6 and showing the valve tilted to the right from its neutral position.

Figures 1, 8:
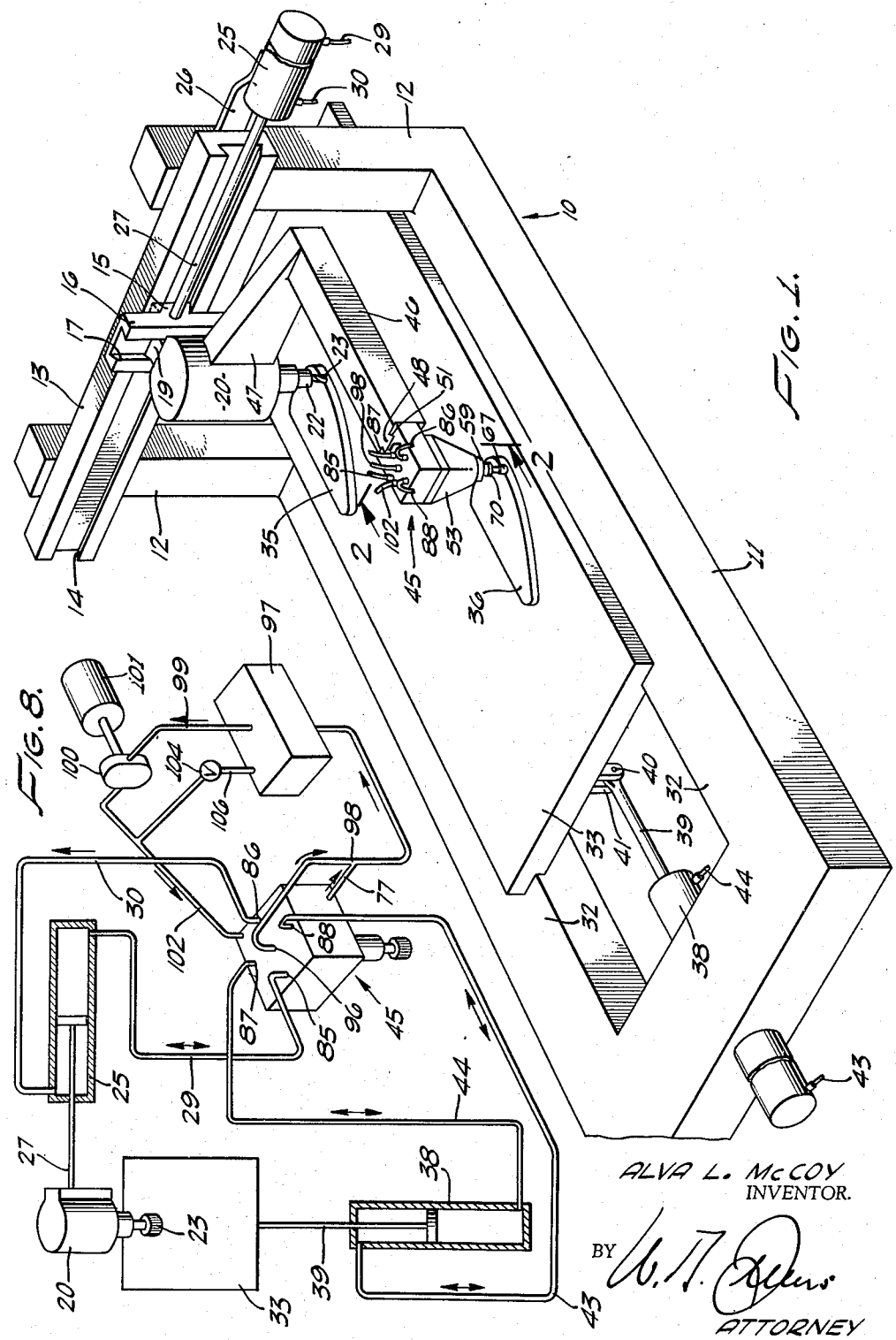
FIGURE 1 is a view in perspective showing the master control valve of this invention employed to control an automatic profiling miller.
FIGURE 8 is a schematic representation of the fluid circuits as provided for the control of the profiling miller shown in FIGURE 1.

It will be understood that the specific application of the control valve forming an important feature of this invention is herein shown as applied to a profiling miller merely as a specific example and not in a limiting sense. It will be recognized that the valve per se is suitable for incorporation in a great variety of control systems without departing from the principles to be fully disclosed herein.

Referring to FIGURE 1, there is shown the essential operating elements of an automatic profiling miller designated generally 10 having a main frame 11 supported on a suitable foundation and having a pair of heavy rigid upright columns 12. Rigidly secured horizontally by columns 12, 12 is a rigid girder or beam 13 provided with an accurately ground guide channel 14. Slidably supported for movement along guide channel 14 is a complementarily shaped boss 15 integral with a vertical member 16 provided with a guideway 17, the latter having converging side walls slidably supporting a mating boss 19 of motor housing 20. Enclosed by housing 20 is a suitable electric or hydraulic driving motor having a chuck 22 secured to the lower end of its vertically disposed shaft for detachably clamping a suitable milling or cutting tool 23. It will be understood that motor housing 20 and its supporting boss 19 may be adjusted vertically along guideway 17 and locked in any desired position by conventional positioning means not shown and per se forming no part of this invention.

The milling cutter and its driving motor together with its supporting structure are adjustable in either direction along guideway 14 of beam 13 in the most minute increments by a hydraulic motor assembly. This assembly includes a hydraulic ram 25 rigidly supported from beam 13 by a bracket 26 with the longitudinal axis of the ram parallel to guideway 14. Enclosed by ram 25 is a piston rigidly affixed to a piston rod 27 extending through a suitable packing gland at the end of the ram and suitably fixed at its other end to the motor mounting member 16. Hydraulic fluid conduits 29 and 30 have their ends secured to nipples communicating with the interior of ram cylinder 25 at its opposite ends, and are operative to supply and exhaust hydraulic fluid from the cylinder by means which will be described presently.

As is clearly shown in FIGURE 1, main frame 11 of the milling machine is generally rectangular in shape and the inner top edges of its side members are accurately ground to provide the guideways 32 slidably supporting the edges of a bed plate 33 to which workpieces to be milled can be clamped. In accordance with customary practice bed plate 33 is provided with a multiplicity of openings (not shown) by which workpieces to be machined can be rigidly clamped. As illustrated in FIGURE 1, an unfinished or semi-finished workpiece 35 to be accurately machined is shown clamped to a forward portion of the bed plate. A similar but previously accurately finished master pattern 36 is shown clamped to a different portion of the bed plate for use in combination with the master control valve of this invention in controlling milling cutter 23 while finish-milling workpiece 35 to correspond precisely with master pattern 36.

The means for reciprocating the bed plate to and fro along guideways 32 comprises a long hydraulic ram 38 suitably supported by frame 11 with its longitudinal axis lying parallel to the path of travel of the bed plate. Enclosed within the ram cylinder is a conventional piston fixed to the end of a piston rod 39 having its forward end connected by a pivot pin 40 to a pair of ears 41 fixed to bed plate 33. Hydraulic fluid conduits 43 and 44 have their ends secured to nipples communicating with the interior opposite ends of cylinder 38 for supplying and exhausting fluid from the cylinder.

The master control valve forming an important feature of this invention and employed to control automatically the flow of fluid to ram cylinders 25 and 28 is detachably mounted on the end of a rigid L-shaped bracket 46 having its shorter arm 47 rigidly secured to the side wall of motor housing 20. As is shown in FIGURE 3, the end of bracket 46 is provided with a boss 48 having flaring lateral edges 49 forming a snug sliding fit with a slot 50 in one side wall of a control valve designated generally 45.

Referring more particularly to FIGURES 2, 3 and 4, it will be seen that master control valve 45 comprises a main housing formed in two halves 52 and 53 rigidly clamped together by cap screws 54 accessible from the flat upper end of the housing. The mating faces of the two halves lie on a plane horizontally bisecting a spherical chamber 55 and have grooveways seating a suitable sealing gasket such as O-ring 56. Opening downwardly from the bottom of chamber 55 is a large bore 57 threaded at 58 to seat adjustably a bushing 59 for a purpose to be described presently.

Having a close running fit with the spherical walls of chamber 55 is a unitary ball valve designated generally 60 having its upper and lower polar ends cut away as is indicated at 61 and 62. Valve stem 63 is integral with or rigidly secured to the flattened lower polar end 62 of the valve with its axis lying along the vertical diameter of the ball. This stem extends through bore 57 and is provided at its lower end with a well 65. A stylus 67 having a shank 68 is shown clamped in well 65 by a set screw 66.

It will be understood that stem 63 and stylus 67 may be referred to interchangeably as the valve stem, the stylus, the feeler element or as the actuating control for the valve inasmuch as in certain applications of the valve one terminology is suitable and in other applications different terminology is more appropriate.

Stem 63 is provided with a frusto-conical enlargement 70 close to the outer end of bushing 59 and cooperates with this bushing in providing an adjustable stop limiting the upward movement of the ball in chamber 55, the permissible angular movement of the valve stem depending on the axial spacing between the tapering surface 70 and the adjacent bore end of the bushing. By rotating the bushing in threads 58, the permissible movement can be adjusted. Stem 63 is also preferably provided with a groove 71 seating the inner beaded edge 72 of a resilient sealing diaphragm 73 the outer beaded edge 74 of which seats firmly in a groove 75 of bore 57. A passage 76 opening into bore 67 communicates at its outer end with a drainpipe 77 for draining away any fluid leaking past the lower rim of ball valve 60.

The design of the ball valve is important and includes a wide oil-distributing groove 79 encircling its mid-portion parallel to the upper and lower polar end surfaces 61, 62. Positioned to either side of this groove are two identical lands 80, 81 encircling the ball and of uniform and substantially identical widths throughout their circumferential extent. The parallel opposite edges 82 and 83 of upper land 81 will be referred to hereinafter in connection with the mode of operation.

When the ball valve is in its neutral position at right angles to the vertical axis of the valve housing land 81 exactly blocks the elliptically shaped ports of two pairs of fluid passages designated 85, 86 and 87, 88, respectively (FIGURE 3), these pairs of passages being disposed diametrically of one another with their connecting axes arranged at right angles as is indicated by axes lines 89 and 90, respectively (FIGURE 3). The ends of these passages opening into chamber 55 have identical sector-shaped chambers having ports of generally elliptical shape with their major axes aligned with one another circumferentially of the valve chamber, as is best shown in FIGURES 2 and 4. Referring to FIGURE 4, the port for passage 85 will be described in detail, it being understood that this port is identical in size and shape with those of passages 86, 87, and 88. The upper arcuate edge 92 of the port for passage 85 lies on an arc of a radius indicated by arrow 93 with its lower fixed end located on the horizontal diameter through the valve chamber at a point substantially below the top of the arc 92. The shape of arc 92 is important in that it should lie even with or a few mils above the adjacent rim edge 82 of land 81 as the valve is swung through a maximum arc to the left and right in the plane of FIGURE 4. The shape of the lower edge 94 of the port is likewise important and it will be understood that all portions thereof are so positioned as to be even with or a few mils below edge 83 of land 81 as the valve is swung through a maximum arc to the left and right in the plane of FIGURE 4. The upper and lower edges of the ports for passages 85 and 86 are identical and likewise remain substantially fully blocked as the valve is swung through maximum arcs in a plane normal to FIGURE 4, it being understood that slight but equal leakage takes place through all ports when the valve is in neutral position and through a pair of aligned ports when the valve rotates about the axis of aligned ports.

From the preceding description of the valve ports and of land 81, it will be recognized that the valve can be swung to any position lying in the plane of the drawing with the pivot axis parallel to axis 90 of passages 85 and 86 without opening these ports other than the very slight leakage described in the preceding paragraph. In like manner the valve and its stem 63 can be swung to all positions in a plane normal to FIGURE 4 and lying along the longitudinal axis of the valve body about an axis parallel to axis 89 for passages 85 and 86 without opening these ports to fluid flow other than the described leakage. It follows that when the valve is swung in a plane normal to the axes of passages 87, 88 flow of fluid to and from these passages 85, 86 can be regulated at any desired rate without permitting any except equal leakage flow to or from the associated pair of passages 87, 88. However, should even the slightest movement of the valve occur in any other direction, each of the four ports will be opened to some extent, it being understood that the direction of flow as well as the quantity of flow through each will be directly related to the direction of valve movement from its central or neutral position.

The manner in which the master control valve 45 is connected in circuit to control profile milling machine 10 will now be described by reference to FIGURE 8. The pair of aligned passages 85, 86 of the master valve are there shown connected by conduits 29, 30, respectively, to the opposite ends of the traverse drive cylinder 25, and aligned passages 87, 88 are connected by conduits 44, 43 to the opposite ends of longitudinal drive cylinder 38 for moving bed plate 33 lengthwise of miller frame 11. Fluid exhausts from the top of central valve chamber 55 through passage 96 and conduit 98 back to fluid reservoir 97. Fluid is withdrawn from reservoir 97 through a conduit 99 leading into positive displacement pump 100 driven by a motor 101, the high pressure fluid discharging from this pump passing through conduit 102, passage 103 of the valve housing and into the mid-portion of the high pressure distributing passage 79 encircling the control valve.

Featured and importantly, is the fact that the equal width lands 80, 81 separated by the centrally disposed fluid-distributing groove 79 and the connection of the polar ends of the ball valve to the fluid reservoir serves to equalize the fluid pressure on the control valve. In consequence, the very high hydraulic pressures commonly employed in control circuits act uniformly on the described ball valve and the same virtually floats in a film of fluid present between the surfaces of lands 80, 81 and the walls of chamber 55. Accordingly the slightest pressure on stylus 67 is effective to shift the valve. Movement of the valve to open the flow ports does have a tendency to unbalance the valve slightly but this can be compensated for by shifting lower land 80 slightly closer to the center line of groove 79 or by other similar compensating expedients well known to those familiar with fluid pressure compensating techniques.

While it might appear that the pressures acting on the separate lands 80, 81 of the ball valve are disproportionate by reason of the considerable area of the fluid ports opening onto land 81 and leading to hydraulic cylinders 25, 38, this is not actually the case as a consideration of FIGURES 2 and 8 will make clear. It will be recognized that groove 79 encircling the midportion of the ball valve is normally charged with fluid under high pressure and that this liquid tends to seep across lands 80, 81 toward the diametrically opposed end surfaces 61, 62 of the ball valve. In consequence, a pressure gradient exists along the film of fluid present transversely of lands 80, 81. This gradient diminishes to zero adjacent the remote edges of these lands. Secondly, it will be understood that diametrically opposed ones of the ports opening into contact with land 81 are connected to the opposite ends of an associated one of the hydraulic cylinders 25, 38. In the neutral position of the ball valve slight leakage inevitably occurs across the inner or larger diameter edge of land 81 and into these ports. Any such leakage occurs only momentarily due to the fact that this leakage soon equalizes the pressure in a given pair of ports because these communicate with opposite ends of an associated hydraulic cylinder. This same equalizing of pressure occurs simultaneously in both cylinders with the result that pressure conditions on all parts of land surface 81 are equal to and exactly balance identical pressure conditions existing on land surface 80.

The only conditions under which a slight unbalanced pressure condition can exist between the two lands 80, 81 is during the period when the valve first moves away from its neutral position and immediately following the return to its neutral position. Such unbalance is both fleeting and slight in magnitude and exists, if at all, only momentarily.

The operation of the above described master control valve as used to control a tracer or profiling mechanism such as the automatic milling machine illustrated in FIGURE 1 is as follows.

It will be assumed that an accurately finished master pattern 36 has been clamped to bed plate 33 below control valve 45 and that an unfinished workpiece 35 similar to this pattern has been clamped to another part of the bed plate with edges corresponding to those of the pattern similarly oriented. Further let it be assumed that there has been mounted in the end of the valve stem 63 a stylus 67 having an external diameter corresponding to the diameter of the milling cutter 23 clamped in chuck 22 of the driving motor. In this connection it will be understood that the diameter of the stylus is always chosen to correspond with the diameter of the milling cutter being used for reasons well understood in this art.

The miller is now in readiness for operation and power is supplied to drive the milling cutter motor and motor 101 driving hydraulic fluid pump 100. The operator presses the stylus to maintain it always in firm contact with the perimeter of pattern 36 applying pressure as necessary to advance it at a steady and uniform rate along the pattern. So long as the stylus and control valve 60 are in a vertical or neutral position only slight but equal leakage fluid flow will occur in the passages of the master valve for the reason that land 81 then blocks all flow in passages 85, 86, 87, 88 and 102. For this reason no high pressure fluid can enter distributing groove 79 from supply passage 103 because all exit ports are closed, and the high pressure fluid returns to reservoir 97 through pressure relief valve 104 and return conduit 106. As described above, the high pressure existing in distributing groove 79 acts uniformly in all directions and equally upon the equal area lands 80 and 81. Since these lands are of equal width and substantially equally spaced to either side of a median plane through distributing groove 79 there is no unequal pressure condition tending to urge the ball valve 60 in any direction. Moreover, the high pressure fluid within groove 79 maintains a film of oil across lands 80 and 81 thereby providing not only a fluid seal between the ball and the spherical side walls of chamber 55 but also a fluid-supporting film holding the valve centrally disposed within the chamber. It will further be clear that pivoting of the valve in any direction does not disturb this balanced and floating condition of the valve in any substantial manner with the result that the slightest pressure on the outer end of the stem suffices to move the valve both away from and toward its neutral position. A slight amount of fluid will, of course, escape from time to time past lands 80 and 81 but such escape is equalized across both lands, any seepage passing into conduits 77 and 98 connecting with one another and leading into the fluid reservoir.

Referring again to FIGURE 1, if the miller is advancing forwardly along the workpiece and toward the upper right-hand corner as viewed in FIGURE 1, the bulge at the forward end of pattern 36 will deflect the stylus to the right from its neutral position about an axis below and parallel to a line intersecting fluid passage axes 89 and 90 (FIGURE 3), the general direction of stylus movement away from neutral being indicated by arrow 105 in FIGURE 3. Tilting of the valve in the direction indicated opens the high pressure supply groove 79 to passages 86 and 88 allowing high pressure fluid to flow through passages 43 and 30 to cylinders 38 and 25, respectively, causing the piston of each to move the bed plate to the left as viewed in FIGURE 1 and the slide support for motor housing 20 and its cutting tool 23 transversely to the right. Simultaneously with the supply of pressurized fluid to conduits 43 and 30, the upper edge 82 of land 81 will fall below the edges of the ports for passages 85 and 87 allowing fluid to exhaust from cylinders 25 and 38 through conduits 29 and 44, respectively into the upper end of chamber 55 and outwardly through passage 96 and conduit 98 to reservoir 97. As motor housing 20 and bed plate 33 adjust the infinitesimal increments required, stylus 67 will return to neutral as it is held pressed against the accurately cut edge of pattern 36.

It is important to note at this point that the return of the stylus to neutral substantially closes land edges 81 and 82, respectively, across the associated wide arc edges 92 and 94, respectively, of the ports. This factor taken with the fact that the land is a very few mils narrower than the minor axis of the elliptically shaped ports provides a very gradual or feathered cut-off of the fluid flow and enables the master control valve to anticipate the effective cut-off and thereby to slow down the adjustment in a manner preventing any over-run whatever in making a given adjustment. The very slight but equal leakage past each edge of each port in the neutral position of the valve effects no change in the positions of the rams and avoids hydraulic shocks unavoidably associated with initiation and stoppage of high pressure flow in hydraulic circuits. The importance of this fact will be better appreciated in connection with wide-range excursions of the stylus from its neutral position and particularly when performed rapidly on the return movement to neutral. As the stylus moves away from neutral the inlet and outlet ports to the two power cylinders 25 and 38 increase at a gradual rate irrespective of the rapidity of stylus movement, thereby enabling the associated pistons to get into motion without shock. Equally important, is the fact that at the end of the stylus excursion flow from both the inlet and outlet passages of the cylinders is feathered in such manner as to eliminate over-run and shock in all parts of the mechanism. This characteristic coupled with the pressure-balanced arrangement of the control valve in its housing accounts for the extremely smooth and precise control characteristics of the device and its instant response to the slightest input effort to the control stylus.

Furthermore, due to the elongated and precise design of the fluid ports relative to the spherical control land 81, the described valve is equally sensitive and responsive to a departure from neutral throughout 360° about its neutral axis.

Referring to FIGURES 5, 6 and 7, there is shown an alternate embodiment of the master control valve designated generally 45' and wherein a majority of its components and design features are identical with those discussed above in connection with the first described embodiment. Accordingly, the same or similar structural features are designated by the same reference character as in the first embodiment but distinguished therefrom by the addition of a prime. For this reason it will be unnecessary to repeat a description of features so designated. The principal differences are confined to the connection between ball valve 60' and its operating control member or stylus 63', the latter being connected to an upper portion of the ball valve through a universal ball and socket joint and having an independent ball and socket support for member 63' at the lower end of bore 57' in the valve housing. It will be understood that ball valve 60' pivots about the center of spherical chamber 55' as in the first described embodiment but is actuated through a control member operating with a mechanical advantage.

As is shown in FIGURES 5 and 7, control stem 63' for the ball valve is provided intermediate its ends with a spherical surfaced enlargement 108 supported for universal pivotal movement in a pair of complementary shaped rings 109 split for assembly about ball 108 and having a press fit within a specially prepared portion 110 of bore 57'. The described mounting for stem 63' permits the latter to pivot freely in any direction about the center of enlargement 108, such pivotal movement being limited by adjustable bushing 59' mounted at the lower end of 57' and cooperating with a frusto-conically surfaced stop 70' carried by the valve stem.

The upper half of the valve stem extends through a central bore 111 in ball valve 60', this bore being normal to a transverse median plane parallel to lands 80' and 81'. The upper end of the bore is suitably recessed to frictionally seat cylindrical bearing ring 112 and its inner surface has a close running fit with the spherically surfaced bearing ring 113 frictionally retained on the reduced upper end of valve stem 63'.

As will be appreciated upon comparing FIGURES 4 and 7, the second embodiment is considerably more sensitive to a given increment of movement of the stylus from neutral position due to the shorter effective lever arm in the second arrangement. Stated differently, the valve stem 63 in the FIGURE 4 form pivots about the center of ball valve 60, whereas stem 63' pivots about the center ball-mounting portion 108 located intermediate the ends of the stem. Since the opposite ends of the stem to either side of ball 108 are approximately equal, a given movement of the stem to the right of its neutral position moves the upper end approximately the same distance to the left, causing the ball valve 60' to pivot about its center. Except for this difference it is to be understood that the second embodiment operates in the same manner as the first embodiment. Also, as is true of the first embodiment, lands 80', 81' are substantially identical and are so disposed to either side of the central high pressure fluid-distributing groove 79' that the valve floats in a pressure balanced condition on a film of oil within chamber 55' in all normal operating positions of the valve. Further, as is true of the first embodiment, groove 79' may be offset slightly from a central plane parallel to lands 80', 81' to the slight extent necessary to compensate in part for pressure unbalance caused by the openings of the ports interconnecting the hydraulic lines to the power cylinders.

While the particular master control valve for multiple hydraulic circuits herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A two-dimensional profiling control mechanism for use on a machine tool utilizing a master pattern to guide the machining of a duplicate element, said mechanism comprising a valve housing provided with a spherical chamber for a valve assembly, a unitary spherical valve means movably supported in said chamber and having a stylus-supporting stem protruding freely through an opening in said valve housing, a pressurized fluid supply opening into said chamber, an exhaust fluid outlet from said chamber, and two pairs of directly opposed inlet and outlet ports opening inwardly through said chamber wall, said pairs of ports being arranged at right angles to one another and adapted to be connected to the opposite ends of hydraulic cylinders, said valve means being under substantially balanced pressure conditions and operable in its normal neutral position to substantially block flow through both of said pairs of ports, and being operable when rotated about its own center in any direction away from neutral to provide flow through said pairs of ports in a direction and quantity determined by the direction and magnitude of movement of said stem from neutral, and said movable valve means being so related to said pairs of ports and to said pressurized fluid supply to said chamber that movement of said valve means away from the neutral position thereof affects the fluid pressure acting on said valve means to a slight extent only.

2. A two-dimensional profiling control mechanism as defined in claim 1 wherein said spherical valve has an annular groove in communication with said pressurized fluid inlet and lying in a diametric plane normal to said stem.

3. A two-dimensional profiling control mechanism as defined in claim 2 wherein said spherical valve has a land of uniform width encircling said valve in a plane normal to said stem and of a width substantially equal to the corresponding width of said pairs of ports, said pairs of ports lying in the same plane as said land and being substantially covered and sealed thereby in the neutral position to said valve means, polar end portions of said valve to either side of said land being cut away to provide unrestricted fluid flow areas.

4. A multiple passage pressurized hydraulic fluid control valve comprising, a housing having a spherical chamber and a large opening through the side wall thereof, hydraulic valve means operating under substantially balanced pressure conditions, said valve means comprising a ball valve in said chamber having a close running fit with the spherical surface of said chamber and movable only about its own center under substantially balanced pressure conditions, said valve having a stem fixed thereto and projecting outwardly through said large opening, and a plurality of pairs of fluid passages opening into said chamber opposite diametric lines disposed at right angles to one another and lying in a plane offset from the center of said ball valve, said ball valve having an annular band of a width exactly closing all of said fluid passages only in a single neutral position of said ball valve, and said ball valve being relieved to either side of said band to handle fluid flow to and from said fluid passages upon any movement of said ball valve from said neutral position.

5. A fluid control valve as defined in claim 4 wherein said housing is split on a diameter of the spherical portion of said chamber, groove means in the face of one of said housing halves for seating resilient gasket means, and means holding said casing halves assembled about said ball valve.

6. A multiple passage hydraulic fluid control valve comprising a two-part housing having a chamber with spherical interior side walls, hydraulic valve means operating under substantially balanced pressure conditions, said valve means comprising a ball valve having a close fit with said spherical side walls and movable only about its own center, a stem extending from said ball valve, said valve having an annular groove therearound coaxially of said stem, inlet means for supplying pressurized fluid to said groove, a portion of said valve diametrically opposite said stem being cut away to provide a fluid outlet opening into an outlet passage, the spherical surface of said valve between said groove and said cutaway portion of the valve being of uniform width and positioned to barely close the ends of a plurality of fluid ports opening into said chamber only when said valve stem is in a predetermined or neutral position, said valve being operable to uncover one edge of at least one of said ports to permit fluid flow into said outlet chamber and an edge of at least one other of said ports to permit flow from said groove to said other port upon movement of said stem in any direction away from said neutral position.

7. A hydraulic control valve as defined in claim 6 wherein said fluid ports are generally elliptical in shape with their longer axes aligned circumferentially of said spherical wall.

8. A hydraulic control valve for use in a profile-type duplicating machine and operating under substantially balanced pressure conditions, said valve comprising a housing adapted to be mounted on an arm rigid with a cutting tool supporting member, said housing having an internal chamber providing a spherical socket for a ball valve, a ball valve substantially filling said valve chamber and having a close pivoting fit with said socket for rotary movement only about its own center and including a stylus-supporting stem extending through an opening of said housing, a plurality of pairs of hydraulic fluid passages opening into said chamber along axes at right angles to one another, said ball valve being operable to substantially block flow between said fluid passages in one predetermined position only of said valve stem and permitting effective fluid flow between at least one pair of said passages upon movement of said stem in any direction away from said one predetermined position, said fluid passages including at least two pairs of aligned passages on the opposite sides of said ball valve and spaced 90 degrees apart circumferentially thereof.

9. A master hydraulic control valve for a plurality of separate power transmitting devices and operating under substantially balanced pressure conditions, said control valve comprising a housing having a generally spherical control valve member housed therewithin and arranged to pivot about its own center, said housing having a plurality of pairs of fluid passages intercepted by said valve member, each of said pair of passages being adapted for connection to a different power transmitting device to actuate the same, and said valve member being selectively operable to control flow through said pairs of passages depending on the magnitude and direction of movement thereof from a predetermined neutral position, said valve member including an operating control lever supported between its ends in a universal joint, and universal joint means interconnecting once end of said lever and said valve member.

10. A master hydraulic control valve for a plurality of hydraulic fluid control circuits and operating under substantially balanced pressure conditions, said control valve comprising a housing formed in two mating parts and cooperating to socket a ball valve therein, a plurality of pairs of fluid passages in said housing intercepted by said ball valve, said ball valve being so formed and related to said passages as to block flow therethrough in one position of said valve and to permit flow in other positions thereof, a control lever for said ball socketed in said housing and having a different portion thereof socketed within said ball valve at a point displaced from the center thereof whereby movement of said lever relative to said housing is effective to pivot said ball valve about its center.

11. A master hydraulic control valve for a plurality of independent hydraulic power actuators and operating under substantially balanced pressure conditions, said control valve having a housing provided with a spherical chamber having a ball valve member movable about the coincident centers of said chamber and valve, said valve member having a stem actuator fixed thereto and extending laterally from said chamber, said valve having a groove about its mid-portion bordered on each side by a spherical-surfaced land of uniform width, fluid passage means adapted to supply pressurized fluid to said groove, a plurality of pairs of fluid passages having ports the centers of which lie in planes at right angles to one another and passing through the center of said ball valve and positioned to be substantially closed by one of said lands in the neutral position of said valve and of the stem therefor whereby all but uniform leakage fluid flow between said passages is blocked, and means providing a fluid outlet from said chamber on the opposite side of said one land from said groove.

12. A master control valve as defined in claim 11, wherein the shape of said diametrically opposed ports is generally elliptical with their major axes aligned circumferentially of said chamber, the opposite curved edges of said ports lying on arcs closely spaced beside the adjacent rim edges of said land as the ball valve is pivoted in opposite directions about a diameter of said valve lying parallel to the axes of each pair of diametrically opposed ports, whereby the pivoting of said valve on an axis parallel to one pair of port axes maintains said pair of ports substantially closed while opening the other pair selectively to flow areas on the opposite sides of said land, and whereby movement of said ball valve in any other direction is effective to open both pairs of ports selectively to the opposite sides of said land and proportionally depending on the direction of movement relative to said intersecting axes.

13. A master control valve as defined in claim 11 wherein said diametrically opposed ports are arcuate shaped with the edges on one side lying within but closely spaced to the adjacent land edge of the valve as the valve pivots about axes parallel to the axes of opposed ports, the edges on the other side of said ports lying within but closely spaced to the adjacent land edge of the valve as the valve pivots about axes parallel to the axes of said opposed ports, whereby all of said ports are substantially closed by said land in the neutral position of the valve, and wherein the ports of each pair are adapted to be selectively in communication with the opposite sides of said land when the valve is displaced from said neutral position and whereby the volume of flow through the ports of a given pair is equal but disproportionate to the equal flow through the ports of the other pair in substantially all positions of the valve.

14. A multiple passage master hydraulic control valve for hydraulic circuits and operating under substantially balanced pressure conditions comprising, a casing provided with a spherical chamber, a ball valve forming a close running fit with said chamber, said valve having a high pressure fluid distributing groove around its mid-portion and positioned between lands of substantially equal width encircling said ball valve, a high pressure fluid supply opening into said groove, excess and leakage fluid outlets from said chamber from points beyond the remote edges of said lands, passages for a plurality of fluid circuits formed in said casing and opening into said chamber opposite at least one of said lands and normally closed against fluid flow thereby except for a slight leakage flow.

15. A high pressure valve operable to control flow in a plurality of circuits in a substantially pressure balanced condition in all operating positions thereof, said valve comprising a housing having a chamber having a spherical valve seating surface, a valve supported for universal movement in said chamber about its own center and in free running surface contact with said valve seating surface, an endless high pressure fluid distributing groove in said valve opening toward and closed by said valve seating surface, fluid supply means communicating with said groove, spherical-surfaced sealing lands on said valve bordering the opposite lateral sides of said groove, and said casing having a plurality of fluid passages having ports opening through said valve seating surface and arranged to be controlled by a land of said valve when positioned across said ports.

16. A tracer type hydraulic control valve operating under substantially balanced pressure conditions comprising, a casing having a valve chamber provided with a spherical surface, a tracing stylus having a valve member operatively connected with one end thereof, said valve member being mounted for universal movement in said chamber with a spherical surface thereof pivotally seated against the spherical surface of said chamber, a pair of fluid passages having axes arranged at right angles to one another across said valve member, said passages having ports shaped and disposed to be substantially closed by said valve member only in a single neutral position thereof, said ports and valve member being so constructed and arranged that the valve member is selectively pivotable about axes parallel to either of said pair of passage axes to vary the rate of fluid flow through one pair of passages while completely blocking flow through the other pair of passages, said ports opening through the spherical surface into said valve chamber and being of generally elliptical shape on said spherical surface and cooperating with one another and with the juxtaposed spherical surface of said valve member in a manner to anticipate the approach of the valve to a neutral flow-blocking position following excursion from neutral whereby cutoff of effective fluid flow occurs gradually to avoid overrun and hydraulic shock.

17. A tracer type control valve operating under substantially balanced pressure conditions comprising a casing having spherical-surfaced chamber, a valve member having a spherical surface and being mounted for universal movement in sealing engagement with said chamber surface, two pairs of fluid passages on axes at right angles to one another, a pair of hydraulic cylinders having their opposite ends connected each to a pair of said passages, said valve having land means positioned to block flow to and from the opposite ends of both cylinders in a neutral position thereof while selectively permitting flow to and from the opposite ends of at least one of said cylinders upon departure of the valve in any direction from said neutral position, and the valve port ends of said passage being of symmetrically elliptical shape and effective to anticipate the approach of the valve to said neutral position and to cut off effective fluid flow gradually as the valve reaches neutral position thereby avoiding over-run and hydraulic shock.

References Cited in the file of this patent

UNITED STATES PATENTS

| | | |
|---|---|---|
| 715,113 | Mitchell | Dec. 2, 1902 |
| 2,221,459 | Sassen | Nov. 12, 1940 |
| 2,239,625 | Roehm | Apr. 22, 1941 |
| 2,389,653 | Turchan et al. | Nov. 27, 1945 |
| 2,448,649 | Adams | Sept. 7, 1948 |
| 2,745,624 | Turchan | May 15, 1956 |
| 2,752,945 | Patterson | July 3, 1956 |
| 2,753,145 | Rosebrook | July 3, 1956 |
| 2,800,839 | Horlacher | July 30, 1957 |
| 2,835,466 | Rosebrook | May 20, 1958 |